(12) United States Patent
Notenbomer

(10) Patent No.: US 6,499,433 B2
(45) Date of Patent: Dec. 31, 2002

(54) HOG FARMING PROCESS AND BARN

(75) Inventor: Robert W. Notenbomer, Medicine Hat (CA)

(73) Assignee: Pure Lean Hogs Inc., Medicine Hat (CA)

(*) Notice: Subject to any disclaimer, the term of this patent is extended or adjusted under 35 U.S.C. 154(b) by 0 days.

(21) Appl. No.: 09/774,883

(22) Filed: Feb. 1, 2001

(65) Prior Publication Data

US 2002/0100427 A1 Aug. 1, 2002

(51) Int. Cl.[7] .............................. A01K 1/01; A01K 1/00
(52) U.S. Cl. ........................................ 119/447; 119/528
(58) Field of Search ................................ 119/447, 448, 119/450, 515, 456, 525, 528

(56) References Cited

U.S. PATENT DOCUMENTS

| | | | |
|---|---|---|---|
| 3,306,257 A | * 2/1967 | Conover | 119/515 |
| 3,601,096 A | 8/1971 | Rutherford | |
| 3,762,372 A | 10/1973 | Mente et al. | |
| 3,859,962 A | 1/1975 | Kissinger, Jr. | |
| 3,884,804 A | * 5/1975 | Robinson et al. | 119/447 |
| 3,982,499 A | 9/1976 | Frankl | |
| 4,140,443 A | * 2/1979 | Olson | 417/490 |
| 4,175,515 A | * 11/1979 | Bradley | 119/447 |
| 4,254,737 A | 3/1981 | Herring | |
| 4,355,568 A | 10/1982 | Steckley | |
| 5,890,454 A | 4/1999 | Moore, Jr. | |

FOREIGN PATENT DOCUMENTS

| | | |
|---|---|---|
| DE | 2031631 A | 1/1972 |
| DE | 2606973 A | 9/1976 |
| DE | 3209569 A | 9/1983 |
| DE | 29810591 U | 9/1998 |
| DE | 29910870 U | 9/1999 |

OTHER PUBLICATIONS

"Sawdust–Flow Pens in Japan", Pig International, Watt Publishing Co. Mount Morris, Illinois, US. vol. 23, No. 6, Jun. 1, 1993 p. 8,10 XP000385489 ISSN. 0191–8834.

* cited by examiner

Primary Examiner—Charles T. Jordan
Assistant Examiner—Elizabeth Shaw
(74) Attorney, Agent, or Firm—Bennett Jones LLP

(57) ABSTRACT

A barn for raising hogs includes walls, a roof, and a floor within the structure for supporting the hogs, the floor being solid such that materials on the floor settle on the floor without passing therethrough and being capable of supporting an animal and the floor including at least one sloped surface and a waste collection area at a lower end of the sloped surface and an animal feeding station adjacent an upper end of the sloped surface. A process is also taught for raising hogs it includes confining hogs on a solid floor, applying compostable, fibrous material to the solid floor, collecting manure-soiled fibrous material from the floor and composting the manure-soiled fibrous material to form a nutrient rich material suitable for use as a compost soil or soil supplement.

46 Claims, 6 Drawing Sheets

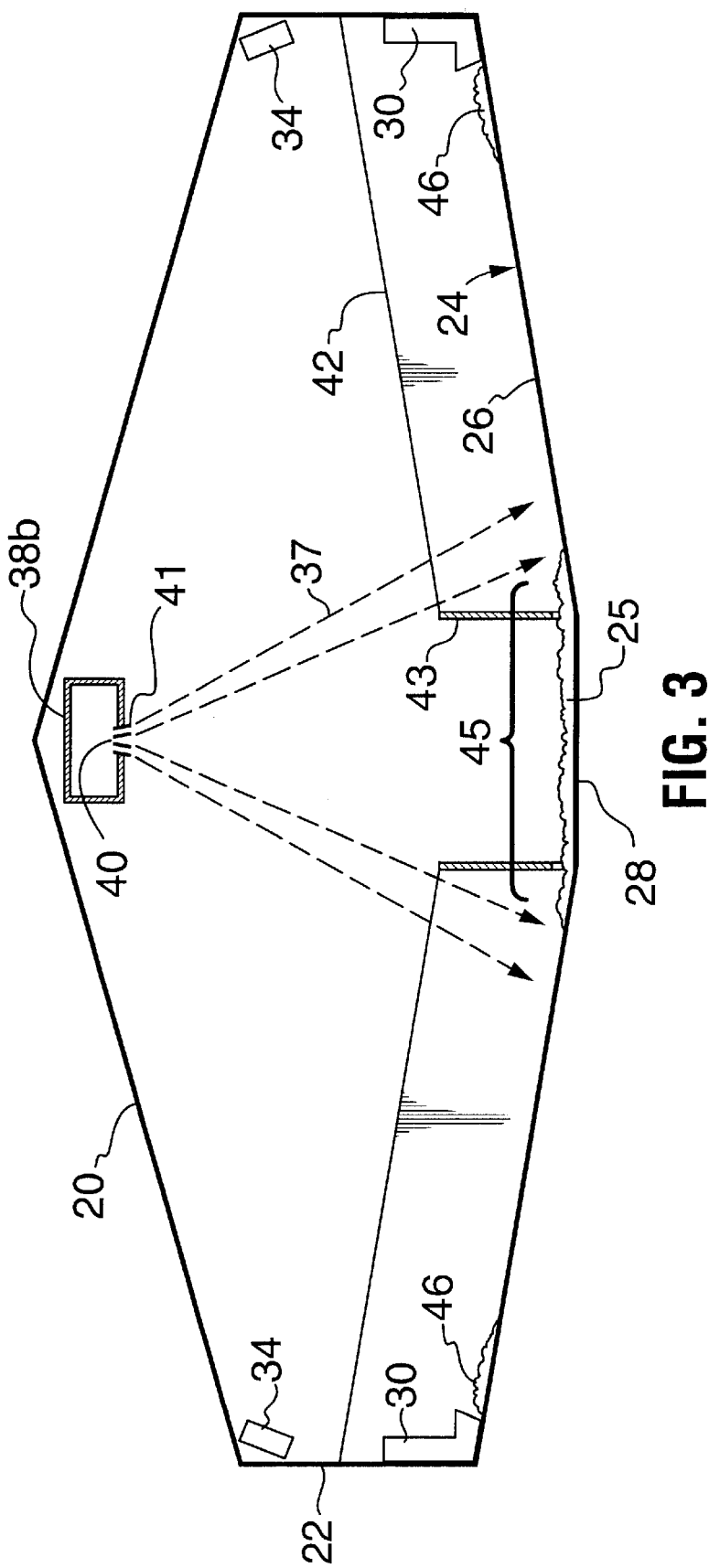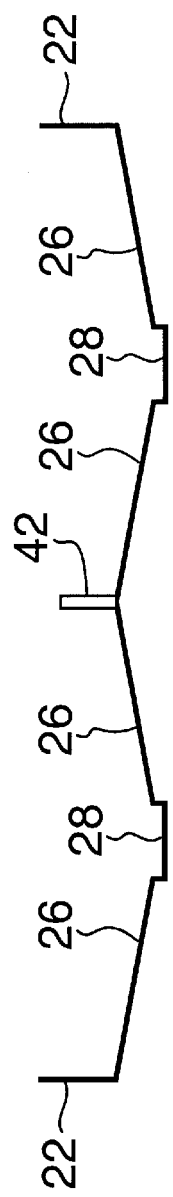
FIG. 3
FIG. 4

HOG FARMING PROCESS AND BARN

FIELD OF THE INVENTION

The present invention is directed to livestock farming processes and barns and in particular to processes and barns for raising hogs.

BACKGROUND OF THE INVENTION

In previous hog farming processes, the hogs are raised in barns with slotted floors. The animal waste drops through the slots in the floor and into a pit, which is normally water filled. The pit is emptied into a holding lagoon outside the barn until it is used for spraying on fields. This process has met with public resistance because of the associated odour and appearance of the outside holding lagoon and health concerns over risk of water contamination.

In addition, the hogs were sometimes under stress because of the cold and cramped barn and slotted floors. The slotted floors tend to be damaging to the hogs hoofed feet. In addition, drafts and moisture rise from the manure mixture below. These conditions can require that the hogs be administered antibiotics to maintain them in a healthy, docile state.

SUMMARY OF THE INVENTION

A hog farming process and barn have been invented that reduce animal stress and effectively handle manure waste without open lagoons.

In one aspect of the present invention, there is provided a barn for raising hogs, the barn comprising: a structure including walls and a roof, a floor within the structure for supporting the hogs, the floor being solid such that materials can settle on the floor without passing therethrough and capable of supporting an animal and the floor including at least one sloped surface and a waste collection area at a lower end of the sloped surface and an animal feeding station providing access to food and water and positioned adjacent an upper end of the sloped surface.

In one embodiment, the barn includes means for creating a temperature differential between an area adjacent the upper end of the sloped surface and an area adjacent the lower end of the sloped surface. The means for creating a temperature differential can be a heater provided to heat an area of the barn adjacent the upper end of the sloped surface. Alternately or in addition, the means for creating a temperature differential is an air circulation system for creating an air draft above the waste collection area.

The animal feeding station is preferably a feeder that contains water in a liquid collection dish. In addition, on-demand means can be provided in the feeder such that food and/or water is released only upon demand of an animal.

In one embodiment, the barn includes at least two sloped surfaces inclining downwardly towards each other and toward the waste collection area. The waste collection area is preferably substantially flat to facilitate waste pick up. Walls can be arranged over the sloping surfaces and the waste collection area to create pens for containment of animals. In one embodiment, the walls have open areas permitting visual communication between the pens. Preferably, these open areas are adjacent the waste collection area.

In another aspect of the present invention there is provided a process for raising hogs, the process comprising: confining hogs on a solid floor, applying compostable, fibrous material to the solid floor, collecting the manure-soiled fibrous material from the floor and composting the manure-soiled fibrous material to form a nutrient rich material.

The fibrous material can be, for example, finely chopped straw, finely chopped newsprint or sawdust. Sawdust is preferred as it also has a pleasant, wood scent that reduces the manure odor within the barn.

In a preferred process, the hogs are confined on a floor that is sloped toward a waste collection area to promote movement of the manure-soiled fibrous material by gravity toward the waste collection area. The floor can additionally include an area conducive to animal sleeping. The process can further include controlling the environment to enhance defecation in the waste collection area.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings:

FIG. 3 is sectional view of another embodiment of a hog barn according to the present invention.

FIG. 4 is a sectional view through another hog barn according to the present invention.

DETAILED DESCRIPTION OF THE PREFERRED EMBODIMENTS

The invention relates to a process for raising hogs. In addition, in another aspect of the present invention, a hog barn is provided. The barn is particularly suited to carrying out the present process.

Figure 1:
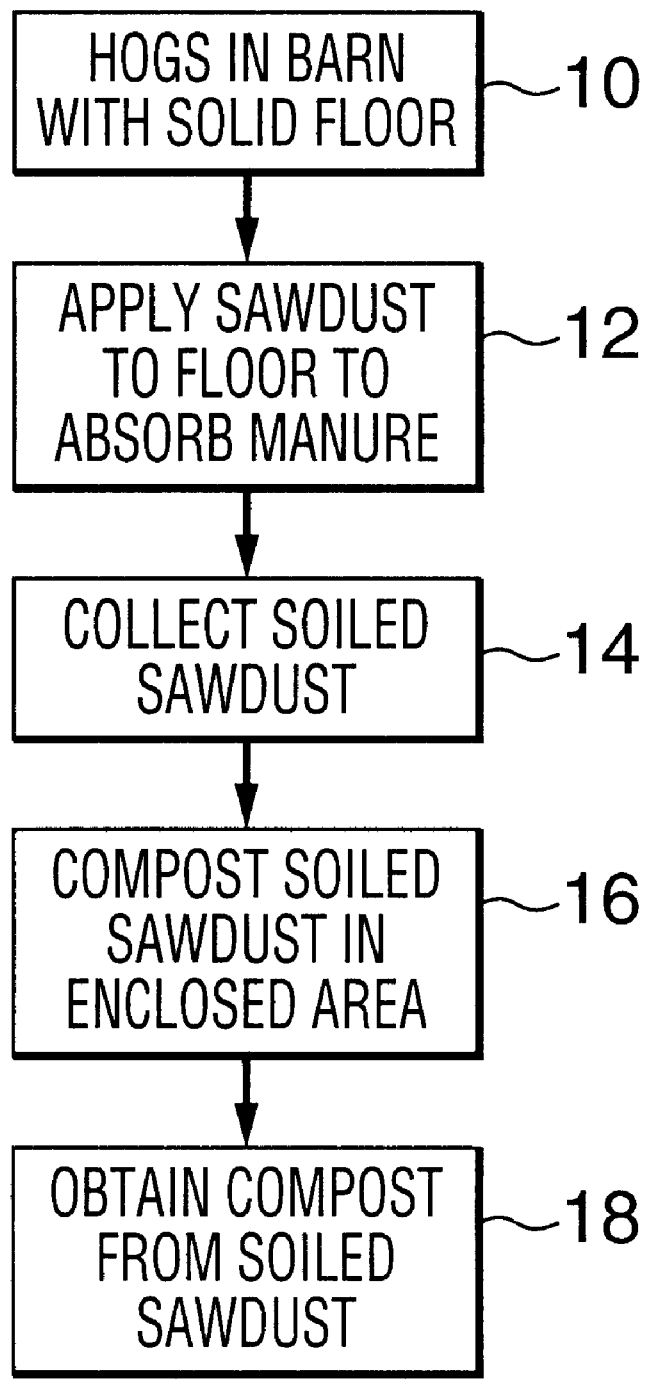
FIG. 1 is a flow chart showing a process for raising hogs according to one aspect of the present invention.

Referring to FIG. 1, the flow chart shows a process for raising hogs according to one aspect of the present invention. In the present process, hogs are raised in a barn with a solid floor, shown in block 10. A solid floor creates a low stress, comfortable environment for the animals and has little or no effect on their feet. As will be appreciated, solid and liquid wastes, herein termed manure, that are dropped by the animals will accumulate on the solid floor. Fibrous, compostable material such as, for example, sawdust is applied 12 to the barn floor, as by blowing. The sawdust acts as an adsorbent for the animal waste and reduces odor in the barn, replacing the manure odor with a wood scent. Over time, when animals drop waste on the sawdust, a manure-soiled sawdust mixture is formed. The mixture is sticky and more easily removed from the floor, handled and moved than wet, untreated manure. Sufficient fibrous materials should be added such that the resultant manure-soiled mixture is sticky but not saturated with liquid. Applying pressure by hand squeezing should result in a formed mass but should not result in a release of liquid from the mixture.

Occasionally, the manure-soiled sawdust is collected, as indicated in block 14, from the barn floor. The frequency of removal will of course depend on a number of factors including the number of animals, the desired cleanliness of the barn and the amount of sawdust applied to the floor. For best results, the manure-soiled sawdust is removed from the floor at least once per day.

In a preferred embodiment, the barn environment is controlled such that the hogs tend to defecate in a selected area. This facilitates collection of the manure mixture. Environmental controls such as heat and drafts are particularly useful for controlling the area of the barn in which the hogs defecate. In addition, placement of feeders can also be used to control the areas in which the hogs tend to defecate. As will be more apparent with respect to FIGS. 2 and 3 hereinbelow, controlled defication can be established by setting up a temperature gradient in the barn. Hogs will tend to defecate in cool, drafty conditions and away from feeding areas and bedding areas, which can be defined by heating an area of the barn.

As indicated in block 16, after collection the manure-soiled fibrous materials are composted to produce a nutrient-rich product substantially free of the harmful bacteria normally associated with manure. In a preferred embodiment, the composting process is conducted in an enclosed area such as another area of the barn or another building. An enclosed area is preferred as the composting process can be controlled and protected from the elements to increase efficiency of the process, and confined, reducing objectionable appearances and odours, over open systems. Saleable and substantially odourless compost is produced from the soiled sawdust. The compost is suitable for use as a potting soil or a soil supplement.

Preferably the composting step is carried out using a continuous throughput process. A composting structure that is particularly useful in a continuous process is described with respect to FIGS. 5 through 9, hereinafter.

Figure 2:
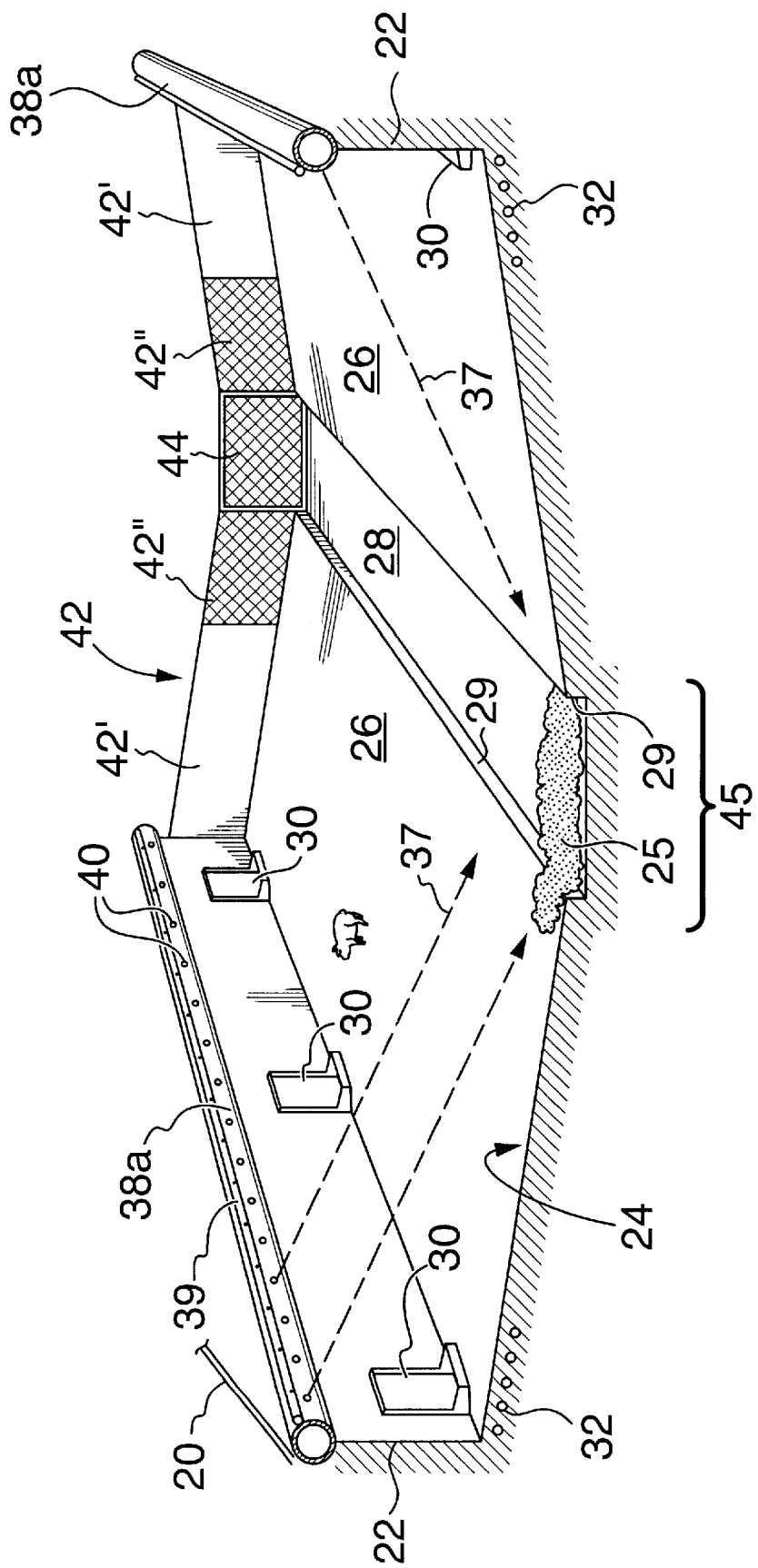
FIG. 2 is a perspective view of a hog barn according to another aspect of the present invention.
Figure 5:
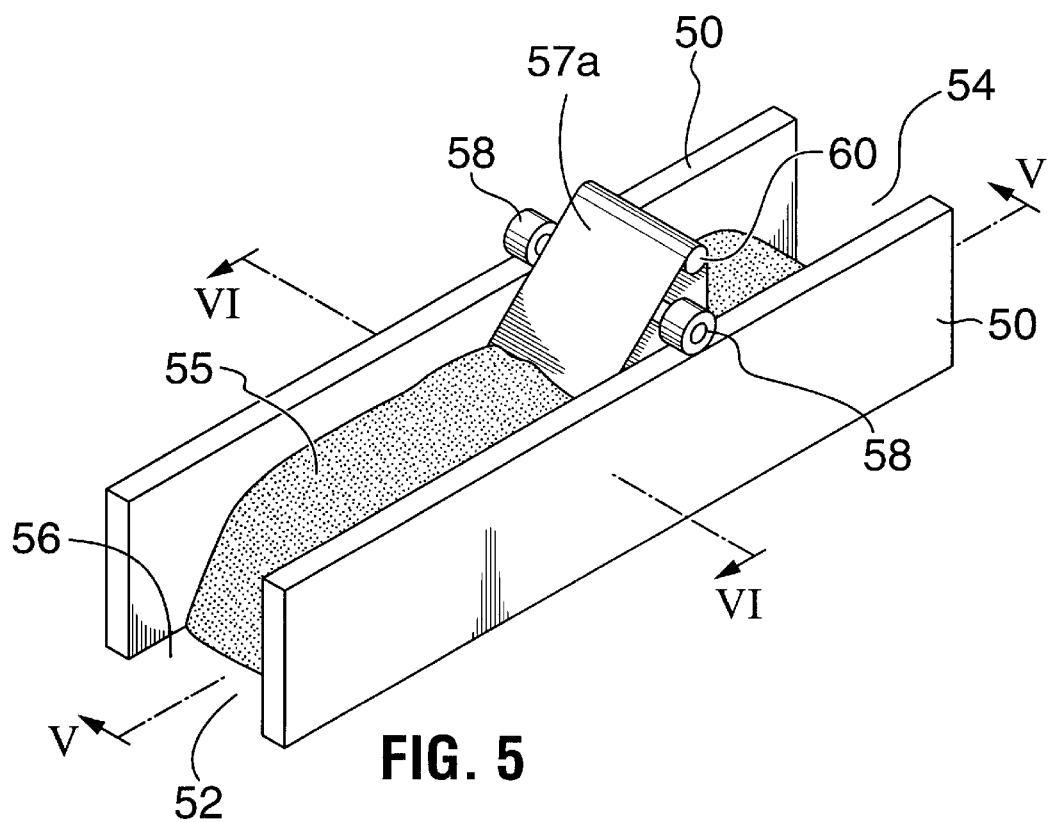
FIG. 5 is a perspective view of a composting facility useful in the present invention.
Figure 6:
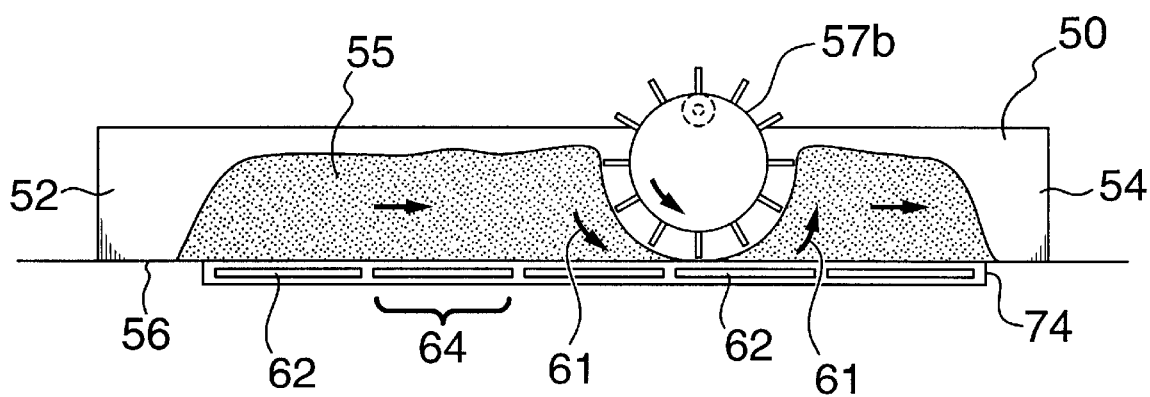
FIG. 6 is a sectional view along line V—V of FIG. 4 with a different kind of turning device.
Figure 7:
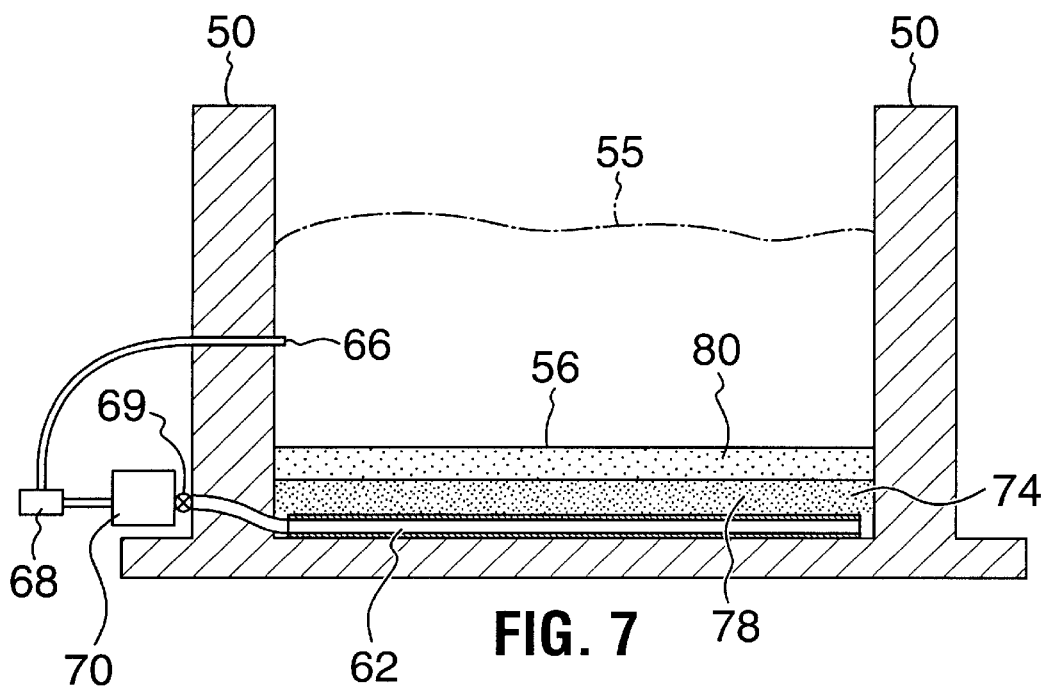
FIG. 7 is a sectional view along line VI—VI of FIG. 4.
Figure 8:
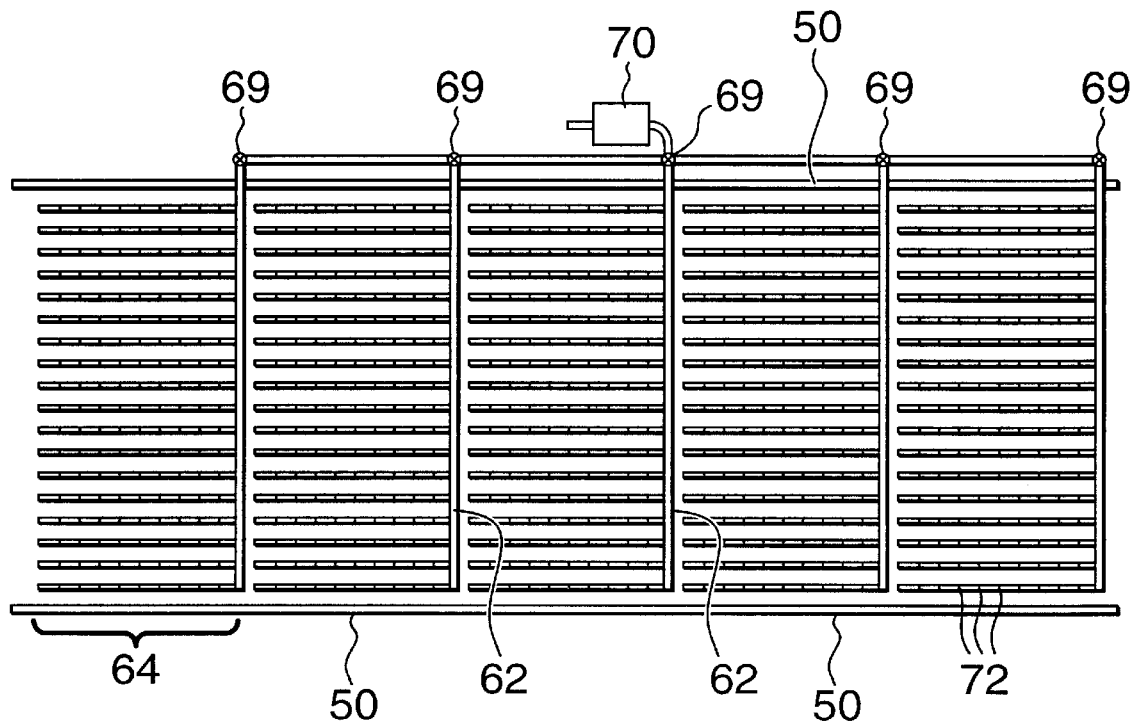
FIG. 8 is a plan view of a composting structure useful in the present invention.
Figure 9:
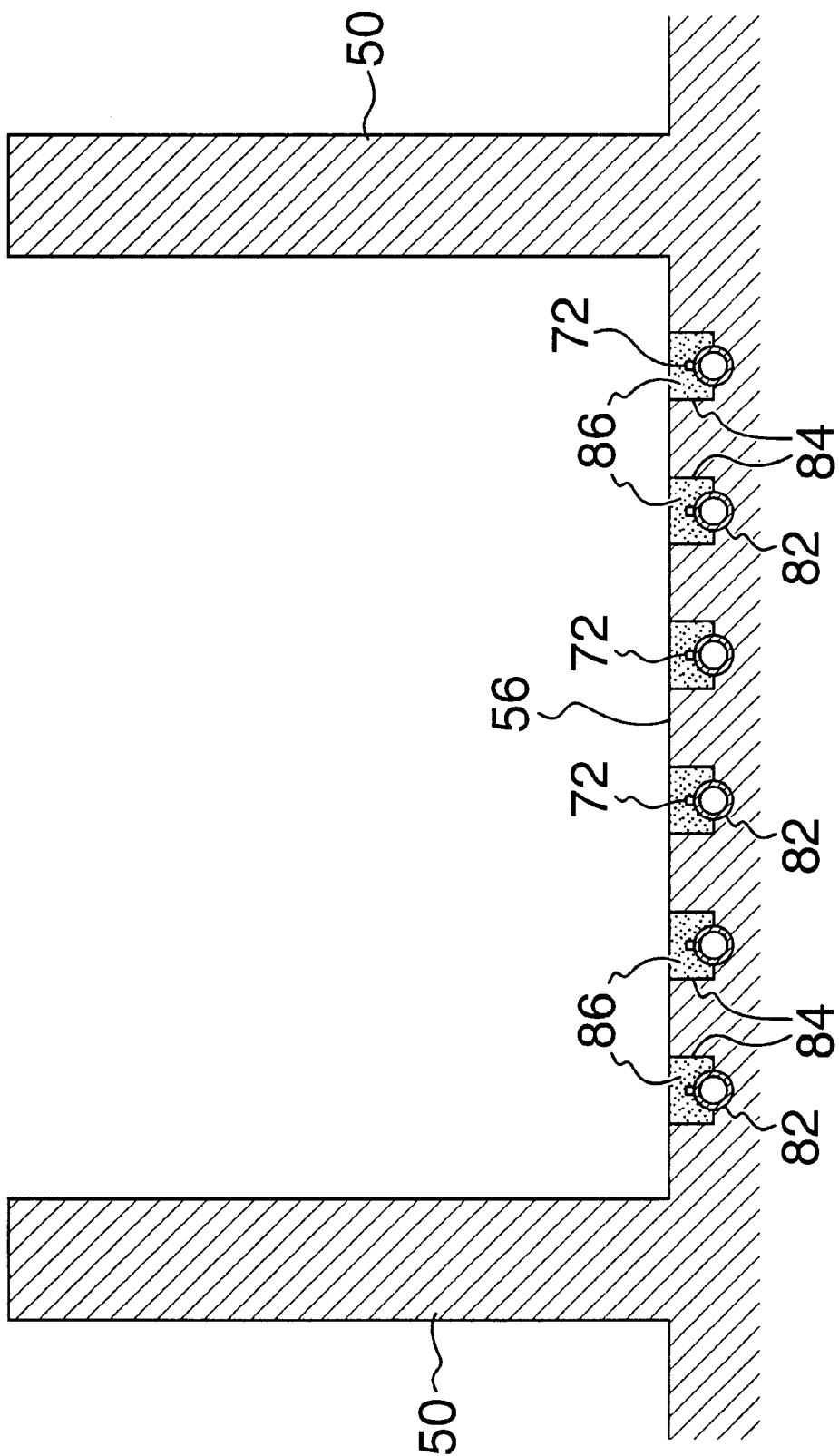
FIG. 9 is a sectional view through another composting structure useful in the present invention.

Referring to FIGS. 2 and 3, a barn according to another aspect of the present invention is shown. While the barn is particularly useful for housing at least a portion of the process described in FIG. 1, it also provides a low stress environment for raising hogs.

The barn includes a roof 20, walls 22 and a floor 24. Various roof and wall structures can be used and are not particularly relevant to the present invention. In hog farming, it is generally accepted that the hogs be housed in a structure that protects the animals from the elements and provides a controlled environment.

Floor 24 is solid; being without the slots or openings normally associated with hog barn floors. In particular, floor 24 is solid such that materials, such as manure 25, which settle on the floor are supported thereon and will not pass therethrough. The floor is also capable of supporting a plurality of hogs. The floor can be, for example, formed of concrete.

The floor includes two sloping planar surfaces 26 that are inclined downwardly toward each other. While the barns illustrated in FIGS. 2 and 3 each have two sloping surfaces 26, it is to be understood that a barn could contain any number of sloping surfaces such as for example, one or four. A schematic view of a floor 24a having four sloping surfaces is shown in FIG. 4. In one preferred embodiment, the sloping surfaces have a 3.0 to 3.5% slope.

Between sloping surfaces 26 is a waste collection area 28. The waste collection area of floor 24 is solid and can support hogs, although in some embodiments it may be fenced to prevent access thereto by the hogs. To facilitate pick-up of the waste, area 28 is flat, open and accessible. In the illustrated embodiment of FIG. 2, the waste collection area is formed as a flat-bottomed gutter. Sides 29 of the gutter facilitate containment of the waste and pick-up. However, it is to be understood that the area can take other forms, as shown in FIG. 3, and need not be level. The waste can be picked up in various ways. However, preferably a small tractor, such as a Bobcat™, carrying a bucket is used. Thus, preferably the waste collection area is sized and positioned in an elongate configuration, along the length of the barn, to facilitate travel therealong by the tractor.

Animal feeding stations 30 are disposed about floor 24. The feeding stations are spaced from waste collection area 28 a sufficient distance to accommodate the animals on sloping surfaces 26 between area 28 and feeding stations 30. In a preferred embodiment, feeding stations are positioned adjacent the upper end of the sloping surfaces a maximum distance away from the waste collection area. To increase cleanliness of the barn floor adjacent the feeders, the feeders are preferably selected to contain water rather than allowing it to spill onto the floor. Not only does this enhance cleanliness, it limits the floor from getting wet and is beneficial since pigs tend to drop waste in wet areas. A particularly useful feeder includes a liquid collection dish and, preferably also, an on-demand switch such that food and water are released only upon demand of an animal. Groba™ wet/dry feeders available from the Netherlands are particularly useful.

A heater such as for example an in-floor hot water system 32 (FIG. 2) or a radiant overhead heater 34 (FIG. 3) is installed to heat the upper end of sloping surfaces 26 to tend to cause the animals to congregate and sleep around the upper ends of the sloping surfaces, rather than near or in waste collection area 28. By heating the area at the upper end of the sloping surfaces, the area around the waste collection area to be relatively cooler. An in-floor hot water system with heated water flowing through pipes 36 embedded in or under floor 24 is preferred for control, safety and efficiency. This heating may not be required in times of the year when outside temperatures are quite warm.

An air circulation system is mounted to direct a draft, indicated by arrows 37, towards the waste collection area. The draft should be directed toward waste collection area 28 such that it impinges that area and possibly the lower end of the sloped surfaces first. This provides that the draft in these areas is cooler and stronger than in other areas of the barn floor. In particular, although air after it impinges the floor in these areas will be redirected to other parts of the barn, that air will be increasingly warmed and diffused.

The air circulation system can include one or more air ducts 38a, 38b with apertures 40, baffles 41 or other means arranged so that air passing therethrough is directed generally toward waste collection area 28. Air is blown through the air ducts and out through the apertures to cool the area around the waste collection area. Misters 39 can be provided to enhance cooling within the barn. Misters 39 release atomised water particles into the air. If the temperature in the barn rises to values of, for example, greater than 28° C., the misters 39 will be activated to release moisture into the air that will bring the temperature down inside the barn. Preferably, the misters are located adjacent apertures in the ducts so that the mist can be circulated with the air and directed first to area 28.

Walls 42, 43 define pen areas and can be arranged in various ways, as desired. For the healthiest, lowest stress environment, a pen should provide at least 11 square feet of space per 250 lb animal. This also promotes a proper dunging pattern. Generally it is not desirable for a pen wall to extend sideways across a sloping surface, but rather with the incline on the sloping surface so that each pen extends from the upper end of the sloping surface to the lower end thereof. Walls 43 can extend to restrict access of the hogs into waste collection area 28, if desired. However, if such walls 43 are present, they must be raised off the floor or include openings to permit waste to pass thereunder into area 28. Closable gates 44 can be provided through the walls for ease of access. Where walls extend through area 28, gates 44 should be positioned to allow clear access along the waste collection area for ease of manure pick-up.

Walls 42, 43 can be solid. Alternately, walls can be open (i.e. constructed of fencing) to permit visual contact by hogs between pens. In a preferred embodiment, walls 42' are solid adjacent feeding stations 30 and heated areas while open walls 42" are positioned adjacent waste collection area 28.

While the barn creates a low stress environment and promotes dunging in a selected area indicated as 45 in or near the waste collection area, to facilitate pick up of manure, to absorb odor and to increase comfort and cleanliness for the animals, fibrous material 46 is applied to the floor, as discussed with respect to FIG. 1. The fibrous material is preferably applied at the upper ends of the sloping surfaces. Over time it will become soiled with manure and be moved towards waste collection area 28. The manure-soiled fibrous material collected from the barn is particularly suited to composting.

A number of factors function to create the favourable conditions in the barn. First by sloping the floors of the barn, waste tends to flow by gravity and by displacement by foot traffic and movement of the hogs about the floor. The amount of fibrous materials applied to the upper end of the sloped surfaces is a significant factor in how fast the manure flows toward area 28. The greater the amount of sawdust used, the faster the manure will be moved off the sloped surfaces. The appropriate amount of sawdust to be used can be determined as discussed in FIG. 1 and care should be taken to ensure that the sawdust is not to wet or too dry when it gets to the waste collection area. In addition, hogs are relatively intelligent and will not defecate near their feeding and sleeping areas. Thus, placement of heated areas and feeding areas away from the waste collection area will increase the tendency of the hogs to defecate in area 28. Cool drafts will also increase the tendency for pigs to defecate. Thus, by directing a flow of air toward area 28, defecation in that area will be increased. Finally, as is known visual contact between hogs in separate pens may cause defecation. Thus, provision of open fencing 42" adjacent the waste collection area further enhances waste accumulation in that area.

Thus, the barn creates an environment where manure tends to be dropped in a selected area, rather than over the entire barn floor and the hogs tend not to sleep or feed in manure-soiled areas. As noted previously, to increase floor cleanliness feeding stations can be selected that control liquid spills and the release of food and water.

A composting structure has been invented to efficiently handle the manure generated from a livestock operation. The structure is shown in FIGS. 5 to 9. This structure is preferably contained in an enclosure to avoid interference by precipitation and wind and to keep the livestock operation clean and substantially odor-free. While the term manure is used herein to describe the material handled by the compost structure, it is to be understood that the material handled by the composter can be dry or sticky manure, manure-soiled fibrous materials or animal carcasses. These materials, after passing through the structure will become nutrient-rich compost.

The composting structure contains the manure and moves it through a 25 to 30-day composting process. Air or oxygen is injected into the manure at regular periods to enhance composting. In particular, the structure has a pair of substantially parallel containment walls 50 extending between two open ends 52, 54. One end 52 is the manure input end and the other 54 is the compost output end. The manure pile 55 rests on floor 56 between the walls and is moved from the input end to the output end over a 25 to 30-day period with aeration and mixing. The walls must be long enough to accommodate 25 to 30 days worth of manure, while allowing for addition of manure to the input end each day. In one exemplary livestock operation, an amount of manure is added to the pile each day that adds 10 linear feet to the pile and the process takes 25 days. Thus the walls are about 250 feet long (10 feet per day×25 days).

Mixing can be done by any suitable means, but preferably a machine 57a, 57b rides along walls 50 and digs into the pile to move the manure along, while causing mixing thereof. The machine includes for example wheels 58 to move it along the walls and a turning device 60 that is moved with the wheels. Turning device 60 is preferably sized to extend down between the walls and nearly to the floor surface so that all manure between the walls is acted on by the turning device in one pass. The turning device can be, for example, a paddle wheel structure (FIG. 6) or a conveyor belt (FIG. 5) or chain drive structure that starts at the output end and digs into the manure pile between the walls, pushing it toward output end 54, as indicated by the arrows 61, and mixing the manure at the same time. This can be done, for example, once each day during the composting process.

Aeration is provided from beneath the manure pile. Air supply pipes 62 are mounted on or in floor 56 between the walls. Preferably the air supply pipes are arranged in a plurality of zones 64 so that relatively more air can be injected into the pile adjacent the input end than the output end. In one embodiment, air is introduced to the pile through pipes 62 for two to four minutes every two hours. Aeration ensures that the composting bacteria continue to work in the pile. Composting occurs optimally when manure temperature stays above 55° C. Thus, when the temperature drops it is indicative that the bacteria are not working effectively. Therefore, preferably, a temperature probe 66 is installed in the structure to determine pile temperature. A thermostat 68 is in communication with the probe to initiate operation of the aeration system, as by opening valves 69 or activating a fan 70, when the temperature of the pile falls below a selected temperature.

The air supply pipes are elongate with regularly spaced nozzles 72. Nozzles 72 can inject air upwardly or downwardly depending on the floor surface construction.

Air supply pipes 62 are positioned out of the way of the turning device, below the effective surface of floor 56. In one embodiment, pipes 62 are positioned in a gravel-filled pit 74 or gravel-filled channels below the effective floor surface between the walls. To avoid getting gravel 78 in the manure, and therefore in the final compost, a layer of cedar bark mulch 80 can be laid above gravel 78. This cedar bark or gravel would be scraped down to a level below the turning device and effectively become an undisturbed floor surface over time.

The pipes 62, gravel 78 and mulch 80 can be replaced by pipes 82 mounted in cement channels 84 in floor 56. Pipes 82 include upwardly directed nozzles 72. This provides a more supportive surface than the gravel and allows equipment to be moved thereover for cleaning, etc. Channels 84 can be filled with pea gravel 86 or other coarse granular material to prevent manure from being caught therein.

The ends 52, 54 are open and at floor level so that the manure can be loaded into the input area and removed from the output area by riding in with a tractor.

It will be apparent that many other changes may be made to the illustrative embodiments, while falling within the scope of the invention and it is intended that all such changes be covered by the claims appended hereto.

The embodiments of the invention in which an exclusive property or privilege is claimed are defined as follows:

1. A barn for raising hogs, the barn comprising: a structure including walls and a roof, a floor within the structure for supporting the hogs, the floor being solid such that materials on the floor settle on the floor without passing therethrough and capable of supporting an animal and the floor including at least one sloped surface and a waste collection area at a lower end of the sloped surface and an animal feeding station adjacent an upper end of the sloped surface.

2. The barn of claim 1 further comprising a heater to heat an area of the barn adjacent the upper end of the sloped surface.

3. The barn of claim 1 further comprising a draft means for creating an air draft above the waste collection area.

4. The barn of claim 1 wherein the animal feeding station is a feeder that contains water in a liquid collection dish.

5. The barn of claim 1 wherein the animal feeding station is a feeder including on-demand means for releasing water upon demand by an animal.

6. The barn of claim 1 comprising at least two sloped surfaces inclining towards each other and toward the waste collection area.

7. The barn of claim 1 wherein the waste collection area is preferably substantially flat to facilitate waste pick up.

8. The barn of claim 1 further comprising walls arranged over the sloping surface to create pens for containment of animals.

9. The barn of claim 8 wherein the walls include open areas permitting visual communication between the pens.

10. The barn of claim 9 wherein the open areas are positioned adjacent the waste collection area.

11. A process for raising hogs, the process comprising: confining hogs on a solid floor, applying compostable, fibrous material to the solid floor, collecting manure-soiled fibrous material from the floor and composting the manure-soiled fibrous material to form a nutrient rich material.

12. The process of claim 11 wherein the hogs are confined on a floor that is sloped toward a waste collection area to promote manure-soiled fibrous material to move by gravity toward the waste collection area.

13. The process of claim 11 further comprising providing an area on the floor conducive to animal sleeping.

14. The process of claim 12 further comprising controlling the environment to enhance defecation in the waste collection area.

15. A barn for raising hogs, the barn comprising: a structure including walls and a roof, a floor within the structure for supporting the hogs, the floor being solid such that materials on the floor settle on the floor without passing therethrough and capable of supporting an animal and the floor including a sloped surface and a waste collection area at a lower end of the sloped surface, the sloped surface and the waste collection area being normally open for access by the hogs and an animal feeding station adjacent an upper end of the sloped surface.

16. The barn of claim 15 further comprising a heater to heat an area of the barn adjacent the upper end of the sloped surface, such that the area of the barn adjacent the upper end of the sloped surface is warmer than an area of the barn adjacent the lower end of the sloped surface.

17. The barn of claim 15 further comprising a draft means for creating an air draft directed toward the waste collection area such that it impinges on the waste collection area of the floor first.

18. The barn of claim 15 wherein the animal feeding station contains water in a liquid collection dish.

19. The barn of claim 15 wherein the animal feeding station includes an on-demand means for releasing water upon demand by an animal.

20. A process for raising hogs, the process comprising: confining hogs on a solid floor including a sloped surface and a waste collection area at a lower end of the sloped surface, applying compostable, fibrous material to the solid floor, collecting manure-soiled fibrous material from the waste collection area and composting the manure-soiled fibrous material to form a nutrient rich material.

21. The process of claim 20 further comprising providing an area on the floor conducive to animal sleeping.

22. The process of claim 20 further comprising controlling the environment for the hogs to enhance defecation in the waste collection area.

23. A barn for raising hogs, the barn comprising: a structure including walls and a roof, a floor within the structure for supporting the hogs, the floor being solid such that materials on the floor settle on the floor without passing therethrough and capable of supporting an animal and the floor including at least one sloped surface and a waste collection area at a lower end of the sloped surface, a draft means for creating an air draft directed toward the waste collection area such that it impinges first on (a) the waste collection area of the floor or (b) the waste collection area and the lower end of the sloped surface, such that the draft in these area is greater than in other areas of the barn floor and an animal feeding station adjacent an upper end of the sloped surface.

24. The barn of claim 23 further comprising a heater to heat an area of the barn adjacent the upper end of the sloped surface, such that the area of the barn adjacent the upper end of the sloped surface is warmer than an area of the barn adjacent the lower end of the sloped surface.

25. The barn of claim 23 wherein the animal feeding station contains water in a liquid collection dish.

26. The barn of claim 23 wherein the animal feeding station includes an on-demand means for releasing water upon demand by an animal.

27. A process for raising hogs, the process comprising: confining hogs on a solid floor including an area adjacent a waste collection area, applying compostable, fibrous material to the solid floor, directing an air draft toward the area adjacent the waste collection area such that it impinges first on the area adjacent the waste collection area of the floor to create an air draft in this area that is greater than in other areas of the floor, collecting manure-soiled fibrous material from the floor and composting the manure-soiled fibrous material to form a nutrient rich material.

28. The process of claim 27 wherein the hogs are confined on a floor that is sloped toward the waste collection area to promote manure-soiled fibrous material to move by gravity toward the waste collection area.

29. The process of claim 27 further comprising providing an area on the floor conducive to animal sleeping.

30. The process of claim 27 wherein the waste collection area is included as a part of the floor on which the hogs are confined.

31. A barn for raising hogs, the barn comprising: a structure including walls and a roof, a floor within the structure for supporting the hogs, the floor being solid such that materials on the floor settle on the floor without passing therethrough and capable of supporting an animal and the floor including at least one sloped surface and a waste collection area at a lower end of the sloped surface, a heater to heat an area of the barn adjacent the upper end of the sloped surface, such that the area of the barn adjacent the upper end of the sloped surface is warmer than an area of the barn adjacent the lower end of the sloped surface and an animal feeding station adjacent an upper end of the sloped surface.

32. The barn of claim 31 further comprising a draft means for creating an air draft directed toward the waste collection area such that it impinges first on (a) the waste collection area of the floor or (b) the waste collection area and the lower end of the sloped surface, such that the draft in these area is greater than in other areas of the barn floor.

33. The barn of claim 31 wherein the animal feeding station contains water in a liquid collection dish.

34. The barn of claim 31 wherein the animal feeding station includes an on-demand means for releasing water upon demand by an animal.

35. A process for raising hogs, the process comprising: confining hogs on a solid floor in a barn including a sleeping area and an area adjacent a waste collection area, applying compostable, fibrous material to the solid floor, heating an area of the barn adjacent the sleeping area such that the area of the barn adjacent the sleeping area is warmer than the area of the barn adjacent the waste collection area, collecting manure-soiled fibrous material from the waste collection area and composting the manure-soiled fibrous material to form a nutrient rich material.

36. The process of claim 35 wherein the hogs are confined on a floor that is sloped toward the waste collection area to promote manure-soiled fibrous material to move by gravity toward the waste collection area.

37. The process of claim 35 further comprising controlling the environment to enhance defecation in the area adjacent the waste collection area.

38. A barn for raising hogs, the barn comprising: a structure including walls and a roof, a floor within the structure for supporting the hogs, the floor being solid such that materials on the floor settle on the floor without passing therethrough and capable of supporting an animal and the floor including at least one sloped surface and a waste collection area at a lower end of the sloped surface and an animal feeding station adjacent an upper end of the sloped surface and selected to contain water rather than allowing it to spill onto the floor.

39. The barn of claim 38 further comprising a heater to heat an area of the barn adjacent the upper end of the sloped surface, such that the area of the barn adjacent the upper end of the sloped surface is warmer than an area of the barn adjacent the lower end of the sloped surface.

40. The barn of claim 38 further comprising a draft means for creating an air draft directed toward the waste collection area such that it impinges first on (a) the waste collection area of the floor or (b) the waste collection area and the lower end of the sloped surface, such that the draft in these area is greater than in other areas of the barn floor.

41. The barn of claim 38 wherein the animal feeding station contains water in a liquid collection dish.

42. The barn of claim 38 wherein the animal feeding station includes an on-demand means for releasing water upon demand by an animal.

43. A process for raising hogs, the process comprising: confining hogs on a solid floor, applying compostable, fibrous material to the solid floor, providing a water supply to the hogs, the water supply selected to be contained rather than being spilled onto the floor, collecting manure-soiled fibrous material from the floor and composting the manure-soiled fibrous material to form a nutrient rich material.

44. The process of claim 43 wherein the hogs are confined on a floor that is sloped toward a waste collection area to promote manure-soiled fibrous material to move by gravity toward the waste collection area.

45. The process of claim 43 further comprising providing an area on the floor conducive to animal sleeping.

46. The process of claim 44 further comprising controlling the environment to enhance defecation in the waste collection area.

* * * * *